(12) United States Patent
Chen et al.

(10) Patent No.: US 8,986,620 B2
(45) Date of Patent: Mar. 24, 2015

(54) SYSTEM FOR TREATING A PLATINUM CONTAMINATED CATALYTIC COMPONENT

(71) Applicant: Cummins Inc., Columbus, IN (US)

(72) Inventors: Xu Chen, Columbus, IN (US); Krishna Kamasamudram, Columbus, IN (US); Neil W. Currier, Columbus, IN (US); Aleksey Yezerets, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/273,019

(22) Filed: May 8, 2014

(65) Prior Publication Data

US 2014/0241947 A1    Aug. 28, 2014

Related U.S. Application Data (62) Division of application No. 13/450,916, filed on Apr. 19, 2012, now Pat. No. 8,822,364.

(60) Provisional application No. 61/476,807, filed on Apr. 19, 2011.

(51) Int. Cl.
| | |
|---|---|
| *B01J 38/02* | (2006.01) |
| *B01D 53/96* | (2006.01) |
| *B01J 29/90* | (2006.01) |
| *B01J 29/072* | (2006.01) |

(52) U.S. Cl.
CPC ............... *B01D 53/96* (2013.01); *B01J 29/90* (2013.01); *B01J 38/02* (2013.01); *B01J 29/072* (2013.01)
USPC .......................................... 422/178; 568/900

(58) Field of Classification Search
USPC ................... 422/178, 619, 233, 144; 588/900
See application file for complete search history.

(56) References Cited

U.S. PATENT DOCUMENTS

| | | | |
|---|---|---|---|
| 4,100,815 A | 7/1978 | Kemper | |
| 4,137,873 A | 2/1979 | Caswell, Sr. | |
| 4,286,552 A | 9/1981 | Tsutsumi | |
| 4,469,055 A | 9/1984 | Caswell | |
| 4,809,650 A | 3/1989 | Arai et al. | |
| 5,308,810 A | 5/1994 | Voss et al. | |
| 6,162,524 A | 12/2000 | Patchett et al. | |
| 6,484,733 B2 | 11/2002 | Budin et al. | |
| 6,510,821 B2 | 1/2003 | Fujimoto et al. | |
| 6,860,244 B2 | 3/2005 | Glugla et al. | |
| 6,913,026 B2 | 7/2005 | Winnestaffer et al. | |
| 7,357,111 B2 | 4/2008 | Maezuru et al. | |
| 7,574,986 B2 | 8/2009 | Ishikawa et al. | |
| 7,592,283 B2 | 9/2009 | Lee et al. | |
| 7,723,251 B2 | 5/2010 | Hartenstein et al. | |
| 7,741,239 B2 | 6/2010 | Hartenstein et al. | |
| 8,822,364 B2 * | 9/2014 | Chen et al. ..................... | 502/56 |
| 2004/0209769 A1 | 10/2004 | Demel et al. | |
| 2007/0000239 A1 | 1/2007 | Liu et al. | |
| 2008/0070778 A1 | 3/2008 | Castellano et al. | |
| 2008/0271440 A1 | 11/2008 | Xu et al. | |
| 2008/0271705 A1 | 11/2008 | Sims | |
| 2009/0272099 A1 | 11/2009 | Garimella et al. | |
| 2009/0314135 A1 | 12/2009 | Karthauser et al. | |
| 2010/0024397 A1 | 2/2010 | Chi et al. | |
| 2010/0050992 A1 | 3/2010 | Nakanishi et al. | |
| 2010/0307140 A1 | 12/2010 | Viola et al. | |
| 2011/0047982 A1 | 3/2011 | Chen et al. | |

FOREIGN PATENT DOCUMENTS

| | | |
|---|---|---|
| WO | 9710421 | 3/1997 |

OTHER PUBLICATIONS

International Search Report and Written Opinion, ISA/US, PCT2012/034216, Cummins Inc., Jul. 8, 2012.

* cited by examiner

*Primary Examiner* — Edward Johnson
(74) *Attorney, Agent, or Firm* — Krieg DeVault LLP

(57) ABSTRACT

An example method includes determining that a selective catalytic reduction (SCR) component having a zeolite-based catalyst is contaminated with platinum (Pt). The method further includes elevating the temperature of the SCR component to at least 600° C. in response to the determining the catalytic component is contaminated with Pt, and maintaining the elevated temperature of the catalytic component for a predetermined time period thereby restoring reduction activity of the catalyst.

17 Claims, 6 Drawing Sheets

SYSTEM FOR TREATING A PLATINUM CONTAMINATED CATALYTIC COMPONENT

RELATED APPLICATIONS

This application is a divisional of U.S. patent application Ser. No. 13/450,916 filed on Apr. 19, 2012, which claims the benefit of the filing date of U.S. Provisional Patent Application 61/476,807 filed on Apr. 19, 2011, each of which is incorporated herein by reference for all purposes.

BACKGROUND

Engine aftertreatment systems are commonly utilized to achieve regulated and desired emissions regulations in engine applications. Many aftertreatment components are catalytic components to promote certain chemical reactions in the aftertreatment system. A common catalyst utilized in aftertreatment systems is platinum. Platinum within a catalytic component can be released over time through wear, thermal events in the component, or by other mechanisms. Released platinum is observed in other downstream catalytic components. The presence of platinum in certain catalytic components can interfere with the proper operation of those components.

SUMMARY

Various embodiments include unique methods to diagnose platinum contamination of catalyst, and methods to rejuvenate catalyst activity. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The schematic flow descriptions which follow provide illustrative embodiments of performing procedures for controlling an aftertreatment system including a $NO_x$ reduction catalyst downstream of a platinum-containing catalyst. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to determine that a catalytic component comprising a high-temperature aging resilience is contaminated with platinum (Pt). The procedure includes an operation to elevate the temperature of the catalytic component to at least 600° C. in response to the determining the catalytic component is contaminated with Pt. The procedure further includes an operation to maintain the elevated temperature of the catalytic component for a predetermined time period.

Certain further embodiments of the procedure are described following. The exemplary procedure further includes determining the predetermined time period in response to one of a minimum $NO_x$ conversion efficiency value and a maximum $NH_3$ oxidation efficiency value for the catalytic component. For example, Pt disposed on the $NO_x$ reduction catalyst reduces a $NO_x$ conversion efficiency of the $NO_x$ reduction catalyst, for example due to parasitic oxidation of the reductant that reduces the amount of reductant effective to reduce $NO_x$. The minimum $NO_x$ conversion efficiency value may be a selected value, a value determined according to an emissions requirement, or other value understood in the art. The minimum $NO_x$ conversion efficiency value may be a value of $NO_x$ reduction per unit of reductant supplied, or a $NO_x$ reduction across the entire $NO_x$ reduction catalyst, as the maximum $NO_x$ conversion capability of the $NO_x$ reduction catalyst may be reduced due to the Pt present. According to the minimum $NO_x$ conversion efficiency value, the predetermined time period may be selected such that sufficient Pt is removed that the $NO_x$ conversion efficiency is restored to a level greater than or equal to the minimum $NO_x$ conversion efficiency value. In certain embodiments, the minimum $NO_x$ conversion efficiency value is greater than a value required to meet $NO_x$ conversion requirements, for example to allow for a service life of the $NO_x$ reduction catalyst after the recovery until the $NO_x$ conversion efficiency degrades again due to further Pt deposition.

In another example, the Pt disposed on the $NO_x$ reduction catalyst increases the $NH_3$ oxidation efficiency (or the oxidation efficiency of another reductant, such as HC). The increase in the $NH_3$ oxidation efficiency increases the operating cost of the $NO_x$ reduction system, and reduces the capability of the $NO_x$ reduction system. The maximum $NH_3$ oxidation efficiency may be selected according to either the required capability of the $NO_x$ reduction catalyst or the required reductant usage efficiency. Additionally or alternatively, the maximum $NH_3$ oxidation efficiency may be selected to be lower than the value required to meet emissions or operating cost targets, for example to allow for a service life of the $NO_x$ reduction catalyst after the recovery until the $NH_3$ oxidation efficiency increases again due to further Pt deposition.

One of skill in the art can readily determine the amount of Pt disposed on the $NO_x$ reduction catalyst that produces unacceptable levels of $NH_3$ oxidation and/or $NO_x$ reduction degradation. Additionally, one of skill in the art can readily determine, having the benefit of the disclosures herein, the predetermined time period according to the elevated temperature, at which acceptable recovery of the $NO_x$ reduction catalyst occurs.

The exemplary procedure further includes determining the predetermined time period in response to a value of the elevated temperature. Increased temperatures recover the $NO_x$ reduction catalyst more rapidly than lower temperatures. The elevated temperature should be at least about 600° C., and in certain embodiments may be at least about 700° C. The predetermined time period for a 600° C. elevated temperature depends upon the desired $NH_3$ oxidation reduction (or $NO_x$ conversion increase), but in a typical embodiment may be between thirty (30) and fifty (50) hours. Applications requiring a lower recovery amount may use predetermined time periods below thirty hours, and applications requiring a higher recovery amount may use predetermined time periods above fifty hours.

The predetermined time period for a 700° C. elevated temperature likewise depends upon the desired recovery amount. In a typical embodiment, significant recovery occurs within about two hours. Significant improvements in recovery are observed out to forty hours and beyond.

The relationship between recovery amount and temperature is understood to be non-linear. The shape of the non-linear curve is dependent upon application-specific factors, including without limitation the nature of the Pt deposited, the substrate geometry and pore structure of the $NO_x$ reduction catalyst, etc. A difference in equivalent recovery amount between 600° C. and 700° C. at the same time period is expected to be at least about 32 ($2^5$) times, and up over 1,000,000 ($2^{20}$) times in certain embodiments. The non-linear curve is expected to continue beyond 700° C., although the upper limit of the elevated temperature will be determined by degradation to the $NO_x$ reduction catalyst. In certain embodiments, the $NO_x$ reduction catalyst is a zeolite based catalyst that is very robust to temperatures at 700° C. (or a little higher), and does not lose $NO_x$ reduction activity in that temperature range. In certain further embodiments, the $NO_x$ reduction catalyst is a zeolite-Cu SCR (selective catalytic reduction) catalyst, and/or a zeolite-Fe catalyst.

In certain embodiments, the procedure includes an operation to determine the predetermined time period in response to an amount of the contamination with Pt. The amount of the contamination of the $NO_x$ reduction catalyst with Pt may be determined according to the nature of a Pt deposition event (e.g. accounting for the type of failure and Pt loading of an upstream catalyst), by an $NH_3$ oxidation efficiency of the $NO_x$ reduction catalyst, by an $N_2O$ formation efficiency of the $NO_x$ reduction catalyst, and/or by a $NO_x$ conversion efficiency value of the $NO_x$ reduction catalyst. The determination of the amount of contamination with Pt may be determined according to operational information available to a controller system, and/or by intrusive tests made to determine the contamination with Pt.

Figure 3:
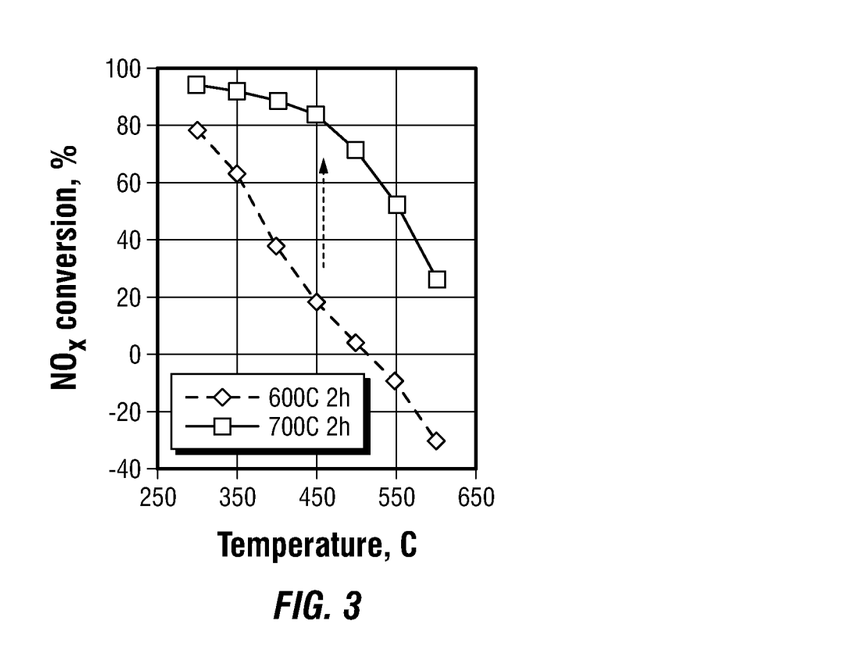
FIG. 3 depicts data illustrating $NO_x$ conversion efficiency recovery of a platinum contaminated catalyst.

Referencing FIG. 3, $NO_x$ conversion efficiency recovery is shown with illustrative data as a function of the elevated temperature and the predetermined time period. In the example of FIG. 3, the provided conditions to run the $NO_x$ conversion efficiency test were a catalyst space velocity of 40 $kh^{-1}$, a gas composition of 10% $O_2$, 7% $H_2O$, 200 ppm $NO_x$, and reductant provided at an ammonia-to-$NO_x$ ratio (ANR) of 1. It can be seen in FIG. 3 that 700° C. for two hours provides significant $NO_x$ conversion recovery to the Pt contaminated $NO_x$ reduction catalyst.

Figure 4:
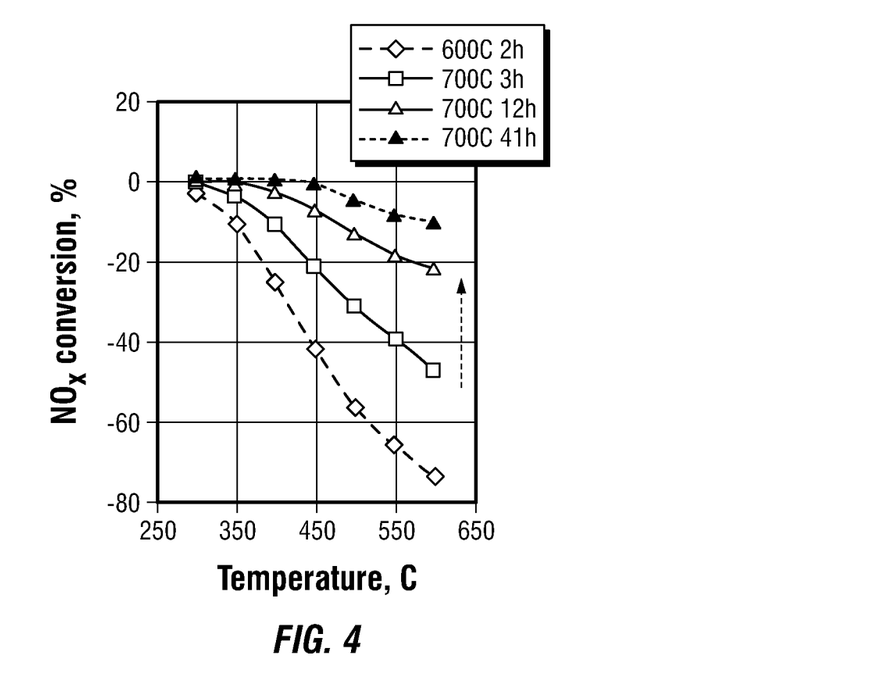
FIG. 4 depicts data illustrating $NO_x$ conversion efficiency recovery of a platinum contaminated catalyst over time.

Referencing FIG. 4, $NO_x$ conversion efficiency recovery is shown with illustrative data as a function of the elevated temperature and the predetermined time period. In the example of FIG. 4, the catalyst $NO_x$ reduction functionality was destroyed by extremely high temperatures over a long period of time before the catalyst was contaminated with Pt. In the example of FIG. 4, the provided conditions to run the $NO_x$ conversion efficiency test were a catalyst space velocity of 40 $kh^{-1}$, a gas composition of 10% $O_2$, 7% $H_2O$, 200 ppm $NO_x$, and reductant provided at an ammonia-to-$NO_x$ ratio (ANR) of 1.

It can be seen in FIG. 4 that 700° C. for three hours provides significant deactivation of Pt activity on the contaminated $NO_x$ reduction catalyst, and that Pt deactivation continues with time for 12 hours and 41 hours at 700° C. The data from FIG. 4 illustrates that Pt deactivation through temperature elevation is effective. The data in FIG. 4, because of the prior destruction of the $NO_x$ reduction functionality, does not illustrate the recovery of $NO_x$ reduction functionality, although the temperatures and times illustrated in FIG. 4, without the prior destruction, are believed to be in the range of temperatures and times that would not be independently destructive to $NO_x$ reduction functionality, and that would otherwise net $NO_x$ reduction functionality recovery in the presence of Pt contamination.

Figure 5:
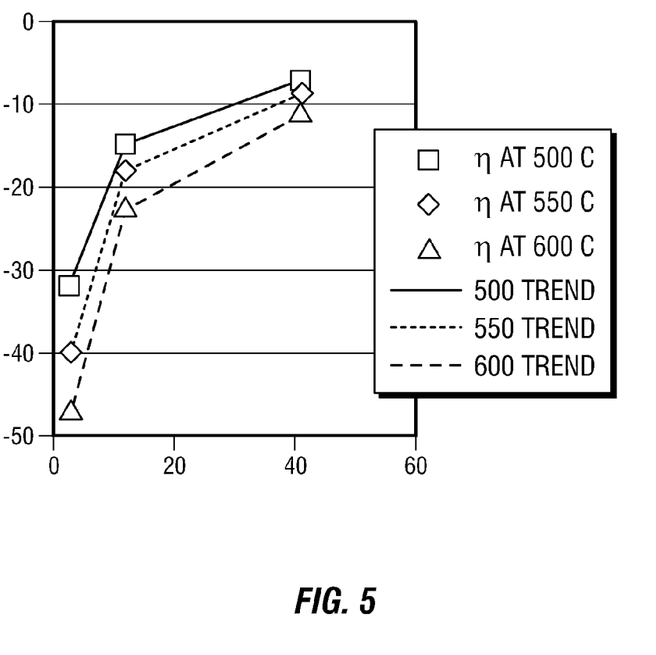
FIG. 5 depicts illustrative curve matching of the data in FIG. 4.

Referencing FIG. 5, the data from FIG. 4 is shown in an alternate arrangement illustrating the recovery curves versus time for the illustrative catalyst system at various $NO_x$ reduction temperatures. It can be seen that the curves approximate asymptotic recovery curves, consistent with an amount of the Pt contamination sintering (or occlusion, removal, or otherwise deactivating the Pt) in proportion to the fraction of unsintered Pt remaining on the catalyst. Further, the character of the recovery curve changes slightly according to the temperature of the $NO_x$ reduction temperature, indicating that some of the Pt may be deactivated with respect to one reduction temperature but slightly active at another reduction temperature. The trend curves plotted in FIG. 3 are matched according to the formula:

$$NO_{xAMT} = Pt_{Max} + \frac{a * \text{Time}}{b + \text{Time}} \qquad \text{Equation 1}$$

$NO_x$ conversion recovery trend.

In Equation 1, the $NO_{xAMT}$ is the current $NO_x$ conversion relative to a properly functional $NO_x$ reduction catalyst (i.e. the data plotted in FIGS. 4 and 5), the $Pt_{MAX}$ is the maximum $NO_x$ conversion degradation (estimated to be the 600° C. 2 hour curve from FIG. 4), and the Time is the recovery time applied. One of skill in the art will recognize the constant "a" to be equal to the maximum recovery amount, and the constant "b" to be the time value at which ½ of the maximum recovery amount will occur. The constants "a" and "b" were matched to the data of FIG. 4 to produce the trend lines in FIG. 5. The match constants for "a" and "b" from the data in FIG. 5 indicate that the recovery events asymptotically approach about 95% recovery, and that about ½ of the $NO_x$ conversion recovery occurs between 3.4 and 4.8 hours at 700° C. for the tested configuration. The illustrated data of FIG. 5 provides one example of a method for one of skill in the art to determine a temperature and recovery time that provides the desired amount of recovery of the $NO_x$ reduction catalyst. Similar data can readily be determined for a particular catalyst formulation. Any method known to one of skill in the art having the benefit of the disclosures herein to determine a recovery temperature and time is contemplated herein.

Figure 6:
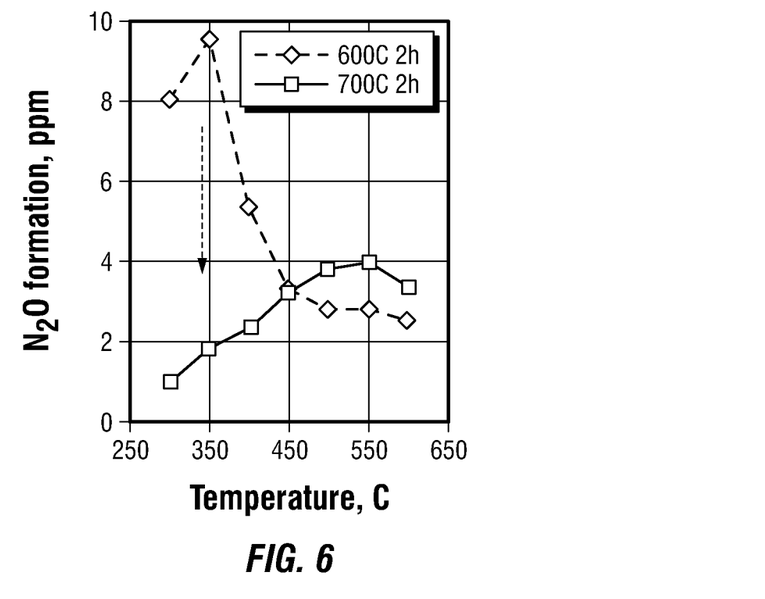
FIG. 6 depicts $N_2O$ formation before and after recovery for an example aftertreatment system.
Figure 7:
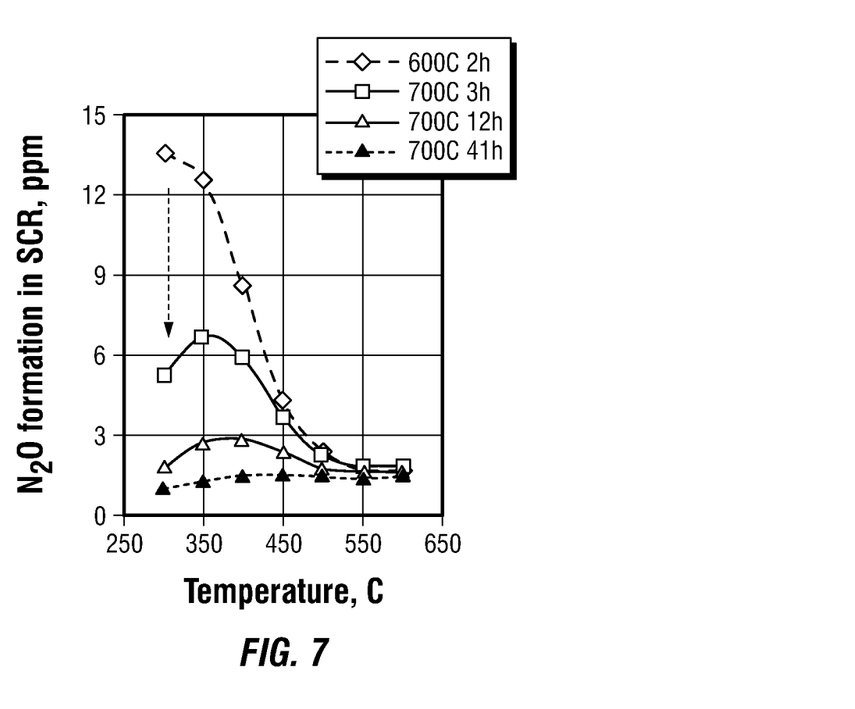
FIG. 7 depicts $N_2O$ formation before and after recovery for another example aftertreatment system.

Referencing FIGS. 6 and 7, illustrative data for two aftertreatment systems shows that $N_2O$ formation, which peaks around 350° C. for most catalyst formulations, is significantly reduced after a recovery operation. The data further shows that $N_2O$ formation improvements are still continuing around 41 hours as illustrated. In the examples of FIGS. 6 and 7, the provided conditions to run the $N_2O$ formation test were a catalyst space velocity of 40 $kh^{-1}$, a gas composition of 10% $O_2$, 7% $H_2O$, 200 ppm $NO_x$, and reductant provided at an ammonia-to-$NO_x$ ratio (ANR) of 1.

Figure 8:
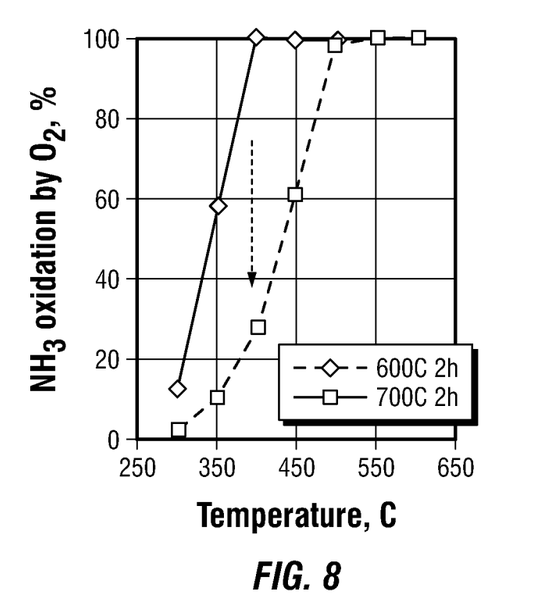
FIG. 8 depicts $NH_3$ oxidation by $O_2$ before and after recovery for an example aftertreatment system.
Figure 9:
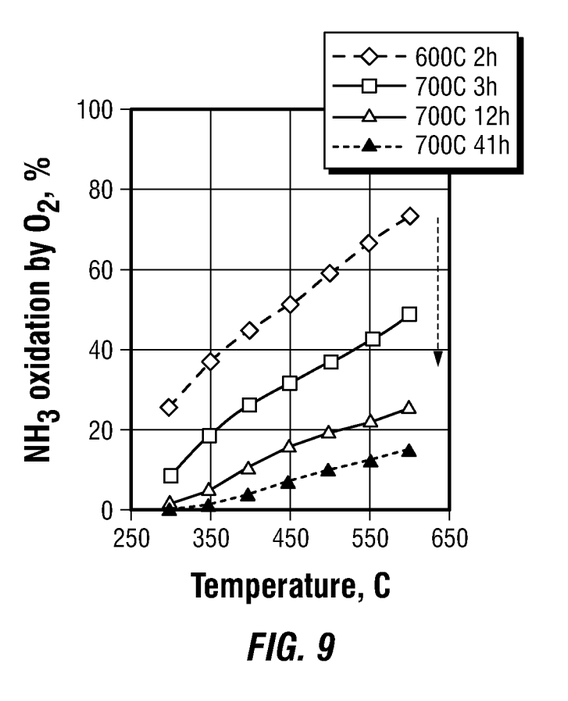
FIG. 9 depicts $NH_3$ oxidation by $O_2$ before and after recovery for another example aftertreatment system.

Referencing FIGS. 8 and 9, illustrative data for two aftertreatment systems shows that $NH_3$ oxidation is significantly reduced after a recovery operation. The data further shows that $NH_3$ oxidation improvements are still continuing around 41 hours as illustrated. In the examples of FIGS. 8 and 9, the provided conditions to run the $NH_3$ oxidation test were a catalyst space velocity of 40 $kh^{-1}$, a gas composition of 10% $O_2$, 7% $H_2O$, and 200 ppm $NH_3$.

Another exemplary procedure for controlling an aftertreatment system including a $NO_x$ reduction catalyst downstream of a platinum containing catalyst is described following. The procedure includes an operation to determine that a selective catalytic reduction (SCR) component having a zeolite-based catalyst is contaminated with platinum (Pt). The procedure further includes an operation to elevate the temperature of the SCR component to at least 600° C. in response to the determining the catalytic component is contaminated with Pt, and an operation to maintain the elevated temperature of the catalytic component for a predetermined time period.

Exemplary operations to determine that the SCR component is contaminated with Pt are described following. An exemplary operation includes determining that a high temperature event has occurred on an upstream platinum catalyzed component. For example, a temperature sensor reading, fault code, or service operator input may include providing information that the high temperature event has occurred.

Another exemplary operation includes performing a reductant dosing test on the SCR component, and determining the SCR component is contaminated with Pt in response to the reductant dosing test. For example, if an increased amount of reductant at a relatively small reductant dosing rate is accompanied by an increased $NO_x$ output reading on $NO_x$ sensor that is downstream of the $NO_x$ reduction catalyst, the SCR component may be contaminated with Pt. At high reductant dosing rates (e.g. higher than ANR=1), it is expected in a normally operating system that some of the reductant slips past the $NO_x$ reduction catalyst as $NH_3$ and is mis-read (due to cross-sensitivity) as $NO_x$. However, at low reductant dosing rates (e.g. lower than ANR=1, 0.7, 0.5, 0.3, or other selected threshold) each incremental increase in reductant dosing should yield a reduction in output $NO_x$ from the system. The reductant dosing test may be performed under conditions where any $NH_3$ adsorption capabilities of the SCR component are not going to interfere with the test—for example where the SCR component storage capacity is small (high temperature) and/or where the SCR component storage capacity is known to be full. The reductant dosing test may be operated as an intrusive test, or may be performed by detecting system conditions that match such a test (e.g. a low and increasing reductant dosing rate) and observing the $NO_x$ output behavior of the system in response to the test.

Another exemplary operation to determine the SCR component is contaminated with Pt includes performing a $NO_x$ conversion efficiency test on the SCR component, performing an $N_2O$ formation test on the SCR component, and/or performing an $NH_3$ oxidation test on the SCR component. The tests on the component may be performed offline by service equipment—for example with the SCR component removed from a vehicle or other application and placed in a test setup.

In certain embodiments, the predetermined time includes a time between thirty and fifty hours. Although the illustrative data of FIGS. 1 through 7 suggest that 2 hours at 600° C. is insufficient to produce significant recovery of the $NO_x$ reduction component, it is estimated that a recovery time that is an order of magnitude larger, and/or a time between 30 to 50 hours, is long enough to initiate some recovery of Pt contamination of a $NO_x$ reduction component (or SCR component).

In certain embodiments, the procedure includes an operation to maintain the elevated temperature of the SCR component to at least 700° C., where the predetermined time period is at least two hours. In certain further embodiments, the predetermined time period is between two and forty-one hours.

An additional or alternate embodiment of the procedure includes an operation to accumulate a regeneration index in response to the elevated temperature, and an operation to determine that the SCR component is regenerated in response to the regeneration index exceeding a threshold value. For example, the regeneration index may accumulate during time periods when a temperature of the SCR component exceeds a threshold temperature (e.g. 600° C.), and when the accumulated regeneration index reaches the threshold value, the regeneration of the SCR component is determined to be fully regenerated. Certain further embodiments include accumulating the regeneration index at a rate that is a function of the temperature of the SCR component. For example, the function may include discrete temperature thresholds and accumulation rates, and/or a continuous (or finely divided) function of the temperature. In a further example, the regeneration index accumulates at a first rate above 600° C., and doubles the accumulation rate every 5° C. to 20° C. above the 600° C. threshold.

In another example, a number of regeneration temperature (of the SCR component, or a temperature associated with the SCR component such as an upstream or downstream temperature) and time values are predetermined and stored in a controller, and the regeneration index is accumulated at a rate consistent with the closest regeneration temperature and time value to the present operating conditions. Alternatively to selecting the closest regeneration temperature and time value, the regeneration temperature and time value having the next lowest temperature relative to the present temperature, the regeneration temperature and time value having the next highest temperature relative to the present temperature, or an interpolated and/or extrapolated regeneration temperature and time value may be utilized to accumulate the regeneration index and/or determine the threshold value of the regeneration index.

Yet another exemplary set of embodiments is a method including determining that a selective catalytic reduction (SCR) component having a catalyst is contaminated with platinum (Pt), and elevating the temperature of the SCR component to a temperature value higher than a normal operating temperature. The method further includes maintaining the elevated temperature of the catalytic component for a rejuvenation time period. In certain embodiments, the normal operating temperature of the SCR component includes any temperatures below 550° C. The elevated temperature includes any values above 550° C., and/or any values in the range 550° C. to 850° C. The elevated temperature may vary during the rejuvenation time period. Alternatively or additionally, the temperature may fall out of the elevated temperature range, and the method may further include pausing the rejuvenation operation and resuming the operation when the temperature returns to the elevated temperature range.

The exemplary method further includes the catalyst being one of a Cu-zeolite and an Fe-zeolite catalyst. It is believed that a Cu-zeolite based SCR catalyst is especially resistant to high temperatures, and in certain embodiments higher values for the elevated temperature range may be utilized for a Cu-zeolite based SCR catalyst, allowing for a lower rejuvenation time period (i.e. faster catalyst recovery).

In certain embodiments, the rejuvenation time period is a value between 5 minutes and 3000 minutes. In certain embodiments, the rejuvenation time period is inversely exponentially related to the elevated temperature, for example where catalyst functionality recovers in an Arrhenius relationship with temperature. In certain embodiments, the method includes dynamically determining the rejuvenation time period in response to the elevated temperature values over time. In a further example, the method includes accumulating a rejuvenation index in response to the elevated temperature values over time, and determining the rejuvenation time period is complete in response to the rejuvenation index exceeding a rejuvenation threshold value.

Yet another exemplary set of embodiments is a method including determining that a selective catalytic reduction (SCR) component having a catalyst is contaminated with platinum (Pt), elevating the temperature of the SCR component to a temperature value higher than a normal operating temperature, and monitoring a Pt contamination index of the SCR component. The method includes stopping the elevating the temperature of the SCR component in response to the Pt contamination index falling below a recovered catalyst value. The recovered catalyst value is a value of the Pt contamination index that is consistent with a properly functioning catalyst, or a catalyst meeting a specification value for the Pt contamination index.

The Pt contamination index may be related to $NH_3$-based $NO_x$ conversion of the SCR component, $N_2O$ formation on the SCR component, and/or $NH_3$ parasitic oxidation performance of the SCR component. In certain embodiments, the method includes monitoring the Pt contamination index by monitoring an $NH_3$-based $NO_x$ conversion efficiency of the SCR component, by monitoring an $N_2O$ formation performance of the SCR component, and/or by determining an $NH_3$ oxidation performance of the SCR component. In certain further embodiments, the Pt contamination index may be monitored during conditions that are expected to provide a usable value of the index parameter, for example de-coupling effects that convolute the index data. In one example, the determining an $NH_3$ oxidation performance of the SCR component is performed at temperatures between 200° C. and 850° C. In another example, the effects of $NH_3$ storage and release are estimated, and the monitoring of the Pt contamination index is performed at times where $NH_3$ storage and/or release are not expected to convolute the Pt contamination index data.

Figure 1A:
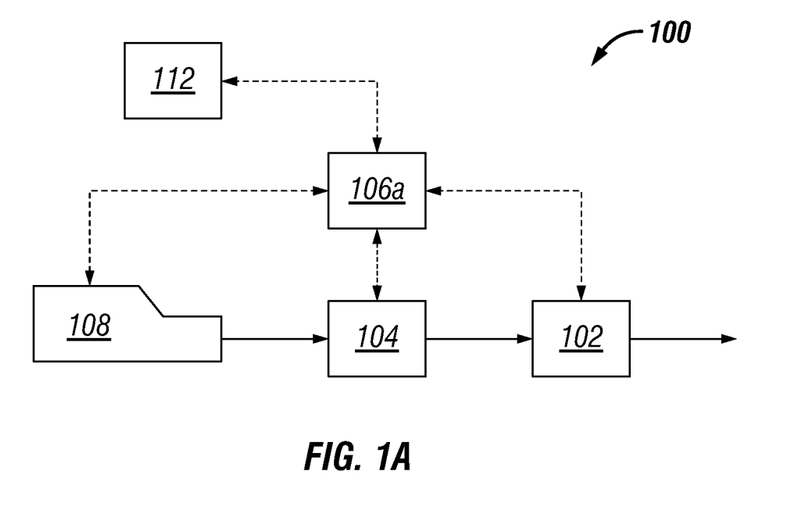
FIG. 1A is a schematic illustration of a first portion of a system for treating a platinum contaminated catalytic component.

Referencing FIG. 1A, a first portion of an example system 100 for recovering a Pt contaminated catalyst is depicted. The example system 100 includes an internal combustion engine 108 that provides an exhaust output as a byproduct of operation. The system 100 further includes an upstream catalyst 104 having an amount of platinum therein. Example and non-limiting upstream catalysts 104 include a close-coupled oxidation catalyst, an oxidation catalyst (such as a diesel oxidation catalyst—DOC), and/or a particulate filter having an amount of platinum deposited thereon (e.g. to assist with regeneration of the particulate filter). The system further includes a $NO_x$ reduction catalyst 102, which may be a zeolite-based $NO_x$ reduction catalyst. Example and non-limiting $NO_x$ reduction catalysts include a Cu-zeolite or an Fe-zeolite catalyst. In certain embodiments, the $NO_x$ reduction catalyst 102 is a selective catalytic reduction (SCR) catalyst.

Figure 1B:
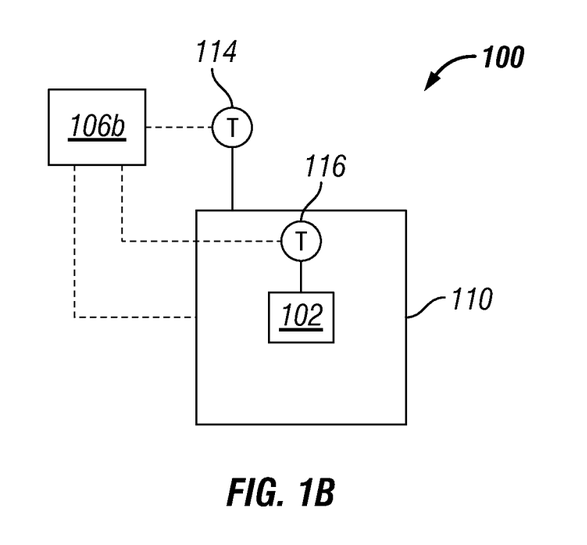
FIG. 1B is a schematic illustration of a first portion of a system for treating a platinum contaminated catalytic component.

In certain embodiments, the system 100 further includes a controller 106 structured to perform certain operations to recover activity of the $NO_x$ reduction catalyst from Pt degradation. In certain embodiments, the controller 106 forms a portion of a processing subsystem including one or more computing devices having memory, processing, and communication hardware. The controller 106 may be a single device or a distributed device, and the functions of the controller 106 may be performed by hardware or software. In the system 100, the controller 106 is shown as a distributed device, with a first controller portion 106a included on an engine controller and/or aftertreatment controller, and a second controller portion 106b being operationally coupled to a catalyst recovery device 110. The controller 106 distribution in FIGS. 1A and 1B is a non-limiting example. The controller 106 is in communication with any sensors, actuators, or other devices in the system 100 as desired or required to perform the operations of the controller 106.

In certain embodiments, the controller 106 includes one or more modules structured to functionally execute the operations of the controller 106. In certain embodiments, the controller 106 includes a Pt contamination module, a degradation reporting module, and a recovery execution module. In certain further embodiments, the controller 106 includes a recovery planning module. The description herein including modules emphasizes the structural independence of the aspects of the controller 106, and illustrates one grouping of operations and responsibilities of the controller 106. Other groupings that execute similar overall operations are understood within the scope of the present application. Modules may be implemented in hardware and/or software on computer readable medium, and modules may be distributed across various hardware or software components. More specific descriptions of certain embodiments of controller 106 operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Referencing FIG. 1B, the system 100 further includes a catalyst recovery device 110 that elevates a temperature of the $NO_x$ reduction catalyst 102, such as a zeolite based catalyst, to at least the rejuvenation temperature for at least the rejuvenation time period. The catalyst recovery device 110 includes any device that can perform the operations of heating the catalyst 102 to the rejuvenation temperature, including an oven, heat exchanger device, and/or a chamber thermally coupled to an oven or heat exchanger device. In certain embodiments, the catalyst recovery device 110 is a device structured to heat the catalyst 102 in-situ while installed in a vehicle or other application (not shown), such as but not limited to an engine having an operating mode capable of heating the catalyst 102, and or a device generating a heated gas stream with a bypass interface to the catalyst 102 such that the catalyst 102 can be heated while remaining installed. In certain embodiments it is desirable to isolate other aftertreatment components from the temperatures generated during the recovery operation of the catalyst 102.

In certain embodiments, the catalyst 102 is removed from the vehicle or other application, and positioned within or thermally coupled to the catalyst recovery device 110 during the recovery operation. The vehicle or related application may be taken out of service during the recovery, and/or a replacement catalyst may be installed in the vehicle or related application while the catalyst is recovered, and the catalyst 102 may then be reinstalled in the vehicle or may be made available as a replacement part after the recovery operation. The system 100 includes a temperature sensor 116 for the catalyst 102 temperature during the recovery operation, and a temperature sensor 114 for the temperature within the catalyst recovery device 110. The illustrated sensors 114, 116 may be present or not in various embodiments of the system 100, and/or other sensors not shown in FIG. 1B may be present.

Figure 2:
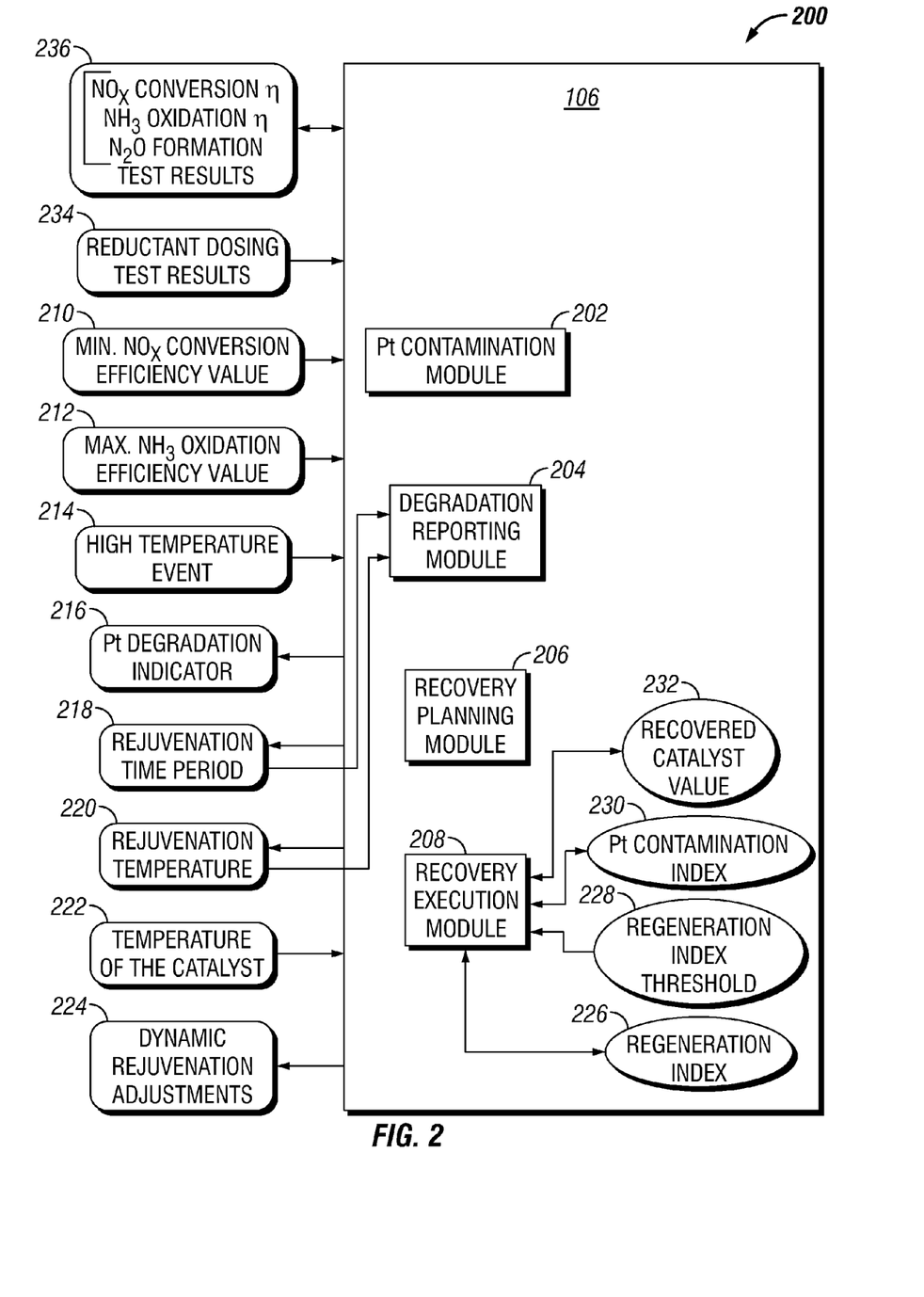
FIG. 2 is a schematic illustration of a processing subsystem for treating a platinum contaminated catalytic component.

Referencing FIG. 2, a processing subsystem 200 is illustrated having a controller 106 for executing operations to determine that a catalyst recovery operation is indicated, and to perform the catalyst recovery operation. The controller 106 is shown as an integrated controller, although the components of the controller may be distributed or integrated, and may be included in hardware or software. The controller 106 includes a platinum (Pt) contamination module having a means for determining that a catalytic component including a zeolite-based catalyst is contaminated with Pt.

The means for determining the catalytic component is contaminated with Pt include any operations and devices understood in the art, including any operations and devices otherwise described herein. In certain embodiments, the controller 106 may perform a reductant dosing test, or otherwise utilize reductant dosing test results 234 to determine whether the catalytic component is contaminated with Pt. In certain embodiments, the controller 106 may perform or otherwise utilize performance test results 236, including from a $NO_x$ conversion efficiency test, an $NH_3$ oxidation efficiency test, and/or an $N_2O$ formation test. In certain embodiments, the Pt contamination module 202 determines the Pt contamination from a minimum $NO_x$ conversion efficiency value 210, from a maximum $NH_3$ oxidation efficiency value 212, and/or from a determination that one or more high temperature events 214 have occurred (e.g. a temperature event high enough to cause degradation on an upstream Pt-containing catalyst).

The Pt contamination module 202 provides a Pt degradation indicator 216, and/or information from which the Pt degradation indicator 216 can be determined. The Pt degradation indicator 216 is a qualitative and/or quantitative value indicating an amount of Pt degradation present on the catalyst component, and/or indicating that the catalyst component is contaminated with Pt and should be recovered. The controller 106 further includes a degradation reporting module 204 that provides the Pt degradation indicator 216 to an output device 112.

An example output device 112 includes an accessible communications queue on a controller, such as a memory location on the controller 106 provided such that a device in communication to the controller 106 can determine the Pt degradation indicator 216 by reading the memory location and/or by requesting an agreed upon message value from the controller 106. Another example output device 112 includes a controller area network (CAN), wherein the Pt degradation indicator 216 is provided as a communication to the CAN. The CAN, where present, may be a private, public, and/or proprietary CAN. Other example output devices 112 include a service tool and/or a malfunction-indicator-lamp (MIL). The described output devices 112 are non-limiting examples, and the degradation reporting module 204 may provide the Pt degradation indicator 216 to multiple output devices 112, including different versions of the Pt degradation indicator 216 to different output devices 112.

The controller 106 further includes a recovery planning module 206 that provides a rejuvenation time period 218 and rejuvenation temperature 220 in response to the Pt degradation indicator 216. The rejuvenation temperature 220 is a temperature value of at least 600° C. In certain embodiments, the rejuvenation temperature 220 is determined from the Pt degradation indicator 216, from the capabilities of the catalyst recovery device, and/or from the available time for the rejuvenation time period 218. Similarly, the rejuvenation time period 218 is determined from the Pt degradation indicator 216, from the capabilities of the catalyst recovery device, and/or from the selected rejuvenation temperature 220. In certain embodiments, the values for the rejuvenation time period 218 and the rejuvenation temperature 220 may be predetermined values, for example from a calibration operation with a similar catalyst to determine appropriate values that achieve acceptable catalyst recovery. In certain embodiments, the values for the rejuvenation time period 218 and the rejuvenation temperature 220 are determined from principles similar to those described with respect to those described in the sections referencing FIGS. 3 through 9.

In certain embodiments, the recovery planning module 206 further provides the rejuvenation time period 218 and the rejuvenation temperature 220 to the degradation reporting module 204, and the degradation reporting module 204 further provides the rejuvenation time period 218 and the rejuvenation temperature 220 to one or more output devices. In certain embodiments, the system 100, for example on the controller 106, further includes a recovery execution module 208 that interprets a temperature of the catalyst 222 during the temperature elevation by the catalyst recovery device, dynamically adjust the rejuvenation time period in response to the temperature of the catalyst 222. In the example, the recovery execution module 208 provides dynamic rejuvenation adjustments 224 during the recovery operation, which may include an adjustment to the rejuvenation time period 218 and/or to the rejuvenation temperature 220.

In certain embodiments, the recovery execution module 208 tracks a Pt contamination index 230 and/or a regeneration index 226 during the recovery operation. The Pt contamination index 230 and/or the regeneration index 226 may be tracked through feedback processes (e.g. using test results 236 similar to those that determine the Pt degradation indicator 216) and/or through modeling (e.g. using principles such as those described in the portions referencing FIGS. 3 through 9). In certain embodiments, the recovery execution module 208 compares the Pt contamination index 230 to a recovered catalyst value 232 to determine completion of the recovery operation. In certain embodiments, the recovery execution module 208 compares the regeneration index 226 to a regeneration index threshold 228 to determine the completion of the recovery operation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an electronic controller comprising:
   a platinum (Pt) contamination module comprising a means for determining that a catalytic component comprising a zeolite-based catalyst is contaminated with Pt;
   a degradation reporting module structured to provide a Pt degradation indicator to an output device;
   a recovery planning module structured to provide a rejuvenation time period and rejuvenation temperature in response to the Pt degradation indicator, wherein the rejuvenation temperature comprises at least 600° C.; and
   a catalyst recovery device structured to elevate a temperature of the zeolite-based catalyst to at least the rejuvenation temperature for at least the rejuvenation time period.

2. The system of claim 1, wherein the recovery planning module is further structured to provide the rejuvenation time period and the rejuvenation temperature to the degradation reporting module, and wherein the degradation reporting module is further structured to provide the rejuvenation time period and the rejuvenation temperature to the output device.

3. The system of claim 1, wherein the output device comprises at least one device selected from the devices consisting of: an accessible communications queue on a controller, a controller area network, a service tool, and a malfunction-indicator-lamp.

4. The system of claim 1, further comprising a recovery execution module structured to interpret a temperature of the catalyst during the temperature elevation, and to dynamically adjust the rejuvenation time period in response to the temperature of the catalyst.

5. The system of claim 1, further comprising an internal combustion operable to produce an exhaust output that is received by the catalytic component.

6. The system of claim 5, further comprising an upstream catalyst upstream of the catalytic component, the upstream catalyst including an amount of platinum.

7. The system of claim 6, wherein the upstream catalyst is at least one of a diesel oxidation catalyst and a particulate filter.

8. A system, comprising:
   a catalytic component in an exhaust system;
   controller structured to receive input associated with operating conditions of the exhaust system and determine the catalytic component is contaminated with Pt in response to the input; and
   a catalyst recovery device structured to elevate a temperature of the catalytic component to at least a rejuvenation temperature for at least a rejuvenation time period in response to the catalytic component being contaminated with Pt, wherein the rejuvenation temperature comprises at least 600° C.

9. The system of claim 8, wherein the rejuvenation time period is determined in response to one of a minimum $NO_x$ conversion efficiency value and a maximum $NH_3$ oxidation efficiency value for the catalytic component.

10. The system of claim 8, wherein the rejuvenation time period is determined in response to a value of the rejuvenation temperature.

11. The system of claim 8, wherein the rejuvenation time period is determined in response to an amount of the contamination with Pt.

12. The system of claim 8, wherein the rejuvenation temperature is at least 700° C.

13. The system of claim 8, wherein the input comprises a high temperature event occurring on an upstream platinum catalyzed component.

14. The system of claim 8, wherein the input comprises a reductant dosing test on the catalytic component indicating the catalytic component is contaminated with Pt.

15. The system of claim 8, further comprising an upstream catalyst upstream of the catalytic component, the upstream catalyst including an amount of platinum.

16. The system of claim 15, wherein the upstream catalyst is at least one of a diesel oxidation catalyst and a particulate filter.

17. The system of claim 8, wherein the catalytic component comprises one of a Cu-zeolite and an Fe-zeolite catalyst.

* * * * *